(12) United States Patent
Huang et al.

(10) Patent No.: US 12,348,429 B2
(45) Date of Patent: Jul. 1, 2025

(54) DATA FORWARDING METHOD AND APPARATUS, DEVICE, AND STORAGE MEDIUM

(71) Applicant: ZTE CORPORATION, Guangdong (CN)

(72) Inventors: Guangping Huang, Guangdong (CN); Yong Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 383 days.

(21) Appl. No.: 17/909,071

(22) PCT Filed: Dec. 11, 2020

(86) PCT No.: PCT/CN2020/135560
§ 371 (c)(1),
(2) Date: Sep. 2, 2022

(87) PCT Pub. No.: WO2021/174943
PCT Pub. Date: Sep. 10, 2021

(65) Prior Publication Data
US 2023/0089240 A1 Mar. 23, 2023

(30) Foreign Application Priority Data
Mar. 2, 2020 (CN) .......................... 202010135471.9

(51) Int. Cl.
*H04L 47/33* (2022.01)
*H04L 45/741* (2022.01)
(Continued)

(52) U.S. Cl.
CPC ............ *H04L 47/33* (2013.01); *H04L 45/741* (2013.01); *H04L 69/22* (2013.01); *H04W 40/24* (2013.01)

(58) Field of Classification Search
CPC ....... H04L 47/33; H04L 45/741; H04L 69/22; H04L 2212/00; H04W 40/24
See application file for complete search history.

(56) References Cited

U.S. PATENT DOCUMENTS

2014/0269724 A1    9/2014  Mehler
2019/0288941 A1*   9/2019  Filsfils .................... H04L 69/22
(Continued)

FOREIGN PATENT DOCUMENTS

CN    106411664 A    2/2017
CN    107925613 A    4/2018
(Continued)

OTHER PUBLICATIONS

Internet Protocol, Version 6 (IPv6) Specification (Year: 1998).*
(Continued)

*Primary Examiner* — Mohammad S Anwar
(74) *Attorney, Agent, or Firm* — KDW Firm PLLC

(57) ABSTRACT

Provided are a data forwarding method and apparatus, a device, and a storage medium. The data forwarding method includes: in response to receiving a user access request, encapsulating a meta array of a first communication node and an original access control message to obtain a first access control message; and forwarding the first access control message to a second communication node according to a pre-orchestrated path.

12 Claims, 4 Drawing Sheets

---

In response to receiving a user access request, encapsulate a meta array of a first communication node and an original access control message to obtain a first access control message — S110

Forward the first access control message to a second communication node according to a pre-orchestrated path — S120

(51) Int. Cl.
*H04L 69/22* (2022.01)
*H04W 40/24* (2009.01)

(56) References Cited

U.S. PATENT DOCUMENTS

2020/0007446 A1 1/2020 Nainar et al.
2020/0119941 A1* 4/2020 Chen ...................... H04L 61/00

FOREIGN PATENT DOCUMENTS

| CN | 108616431 A | 10/2018 |
| CN | 109150673 A | 1/2019 |
| CN | 109561021 A | 4/2019 |
| CN | 110266592 A | 9/2019 |

OTHER PUBLICATIONS

China National Intellectual Property Administration First Office Action and Search Report for CN Application No. 2020101354719, dated Mar. 4, 2024, 14 pages.
International Search Report in International Application No. PCT/CN2020/135560 mailed Mar. 1, 2021, 4 pages.

* cited by examiner

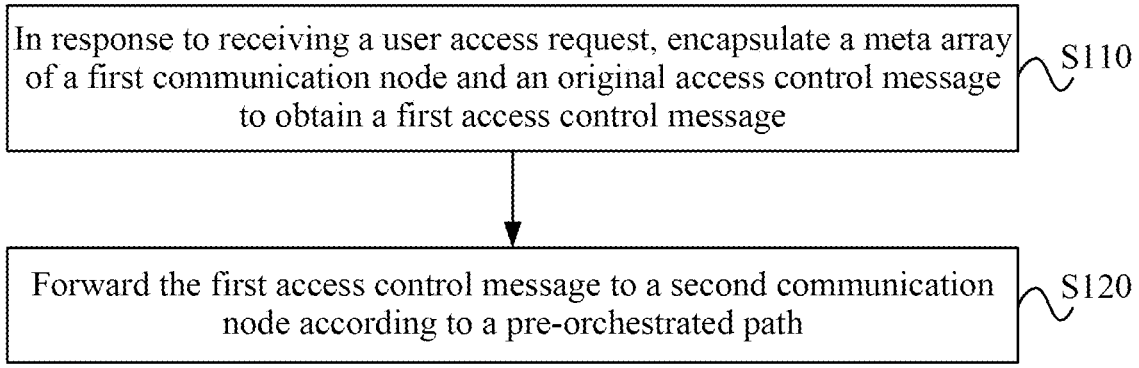
FIG. 1
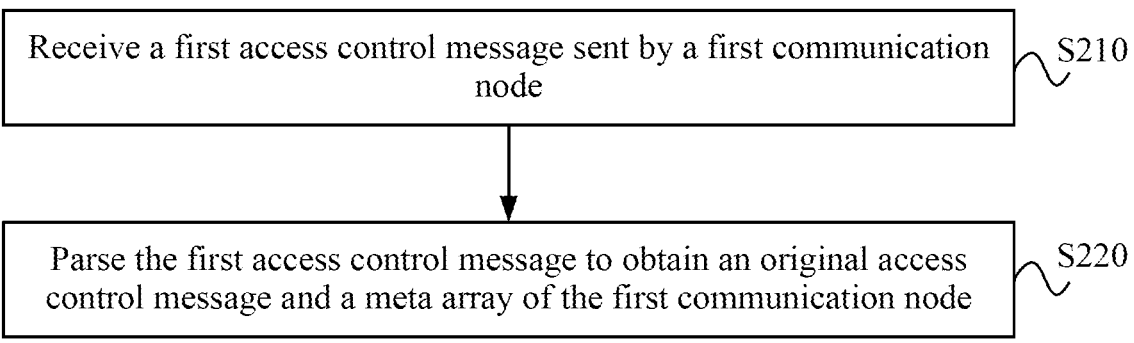
FIG. 2
| Type | Length | Value |
|------|--------|-------|
FIG. 3

UP: BRAS (BNG) user plane  R: Intermediate routing node
CP: BRAS (BNG) control plane  BR: Network domain boundary node UP: BRAS (BNG) user plane   R: Intermediate routing node
CP: BRAS (BNG) control plane

DATA FORWARDING METHOD AND APPARATUS, DEVICE, AND STORAGE MEDIUM

This application claims priority to Chinese Patent Application No. 202010135471.9 filed with the China National Intellectual Property Administration (CNIPA) on Mar. 2, 2020, the disclosure of which is incorporated herein by reference in its entirety.

TECHNICAL FIELD

The present application relates to the field of communications, for example, a data forwarding method and apparatus, a device, and a storage medium.

BACKGROUND

Wired broadband access is the basic access service for services such as home broadband, enterprise private network and public wireless fidelity (WiFi), and the wired broadband access is the second mainstream broadband access service, after mobile broadband. With the rapid development of emerging access service such as Internet Protocol television (IPTV) and high-definition video, the user and control plane (that is, the user plane and the control plane) integration mode of the wired access network device increasingly fails to satisfy the requirements of cloud network architecture and the fast development and delivery of new service. The user and control plane separation of the wired broadband access device based on software-defined networking (SDN)/network functions virtualization (NFV) has become the consensus of the industry, has been commercially deployed in some domestic and international markets, and is being standardized by relevant international and domestic standards organizations actively to achieve the interconnection between the user plane and the control plane of the access device. The deployment of the user and control plane separation includes both the deployment mode within the same network domain and the separate deployment mode across different network domains, that is, the message transmission mechanism between the user plane and the control plane is required to support these two deployment modes. For the transmission of the access control message between the user plane and the control plane of the broadband remote access server (BRAS) (or broadband network gateway (BNG)), one solution is the Layer 2 transmission scheme based on intra-domain routing, such as virtual extensible local area network (VXLAN), which cannot achieve the transmission of the access control message and the intelligent traffic steering of the data flow of the access message in the scenario where the user plane and the control plane are deployed separately in different network domains; another solution is the general packet radio service tunneling protocol-user plane (GTP-U) transmission scheme, which cannot support the intelligent traffic steering of access control message data.

SUMMARY

The present application provides a data forwarding method and apparatus, a device, and a storage medium to achieve the intelligent traffic steering of the access control message data while supporting intra-domain and cross-domain message transmission.

A data forwarding method is provided. The method is applied by a first communication node and includes the following.

In response to receiving a user access request, a meta array of a first communication node and an original access control message are encapsulated to obtain a first access control message.

The first access control message is forwarded to a second communication node according to a pre-orchestrated path.

A data forwarding method is further provided. The method is applied by a second communication node and includes the following.

A first access control message sent by a first communication node is received.

The first access control message is parsed to obtain an original access control message and a meta array of the first communication node.

A data forwarding apparatus is further provided. The apparatus is applied in a first communication node and includes an encapsulation module and a forwarding module.

The encapsulation module is configured to, in response to receiving a user access request, encapsulate a meta array of the first communication node and an original access control message to obtain a first access control message.

The forwarding module is configured to forward the first access control message to a second communication node according to a pre-orchestrated path.

A data forwarding apparatus is further provided. The apparatus is applied in a second communication node and includes a receiving module and a parsing module.

The receiving module is configured to receive a first access control message sent by a first communication node.

The parsing module is configured to parse the first access control message to obtain an original access control message and a meta array of the first communication node.

A device is further provided. The device includes a memory and one or more processors. The memory is configured to store one or more programs.

The one or more programs, when executed by the one or more processors, enable the one or more processors to implement the method of any one of the preceding embodiments.

A storage medium is further provided. The storage medium is configured to store a computer program, and the computer program, when executed by a processor, implements the method of any one of the preceding embodiments.

BRIEF DESCRIPTION OF DRAWINGS

FIG. 1 is a flowchart of a data forwarding method according to an embodiment of the present application;

FIG. 2 is a flowchart of another data forwarding method according to an embodiment of the present application;

FIG. 3 is a schematic diagram illustrating a TLV encapsulation format according to an embodiment of the present application;

DETAILED DESCRIPTION

Figure 4:
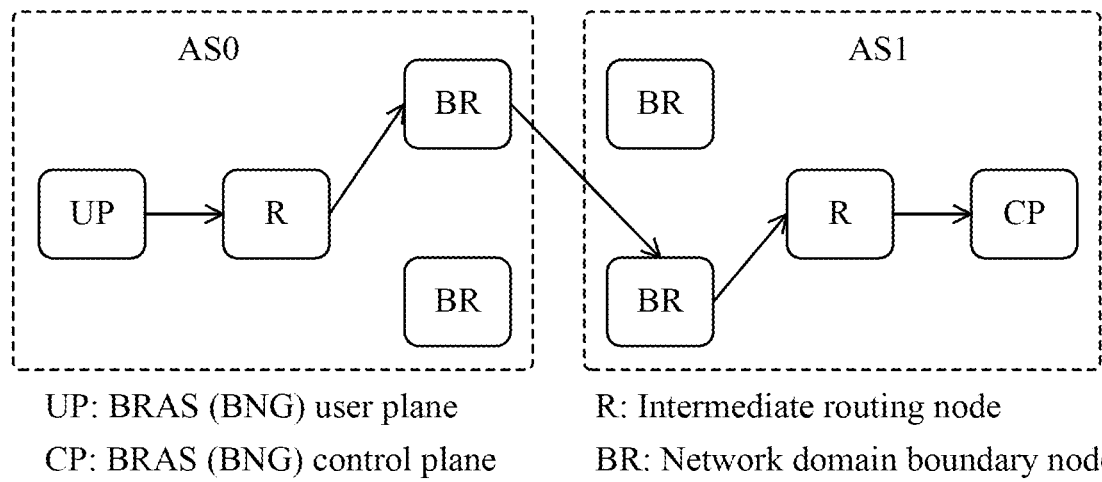
FIG. 4 is a schematic diagram illustrating the user plane and control plane cross-domain transmission of an access control message according to an embodiment of the present application.

Embodiments of the present application are described below in conjunction with drawings. The user plane and the control plane separation of the wired broadband access device are separated to achieve the centralized deployment of the control plane, that is, the control plane is deployed in the cloud and is responsible for the policy management of the user and the control plane, and to achieve the distributed deployment of the user plane, that is, the user plane is close to the user and the uplink and downlink forwarding of user traffic is handled using special-purpose forwarding hardware. Such function division and separation deployment of the user plane and the control plane not only bring about improved operation efficiency and profit but also put forward new requirements for message transmission schemes between the control plane and the user plane.

The wired broadband access is usually divided into two stages: user access control and traffic forwarding. The user access control procedure includes the user access request message interaction procedure and the authentication procedure, such as Point-to-Point Protocol over Ethernet (PPPoE)/IP over Ethernet (IPoE)/Layer 2 Tunneling Protocol (L2TP). The initiation of the user access request message interaction procedure is performed by a user access gateway such as a residential gateway (RG), a broadband remote access server user plane (BRAS-UP) of the BRAS is accessed via an access network (AN) device (such as a digital subscriber line access multiplexer (DSLAM) or an optical line terminal (OLT)), and the BRAS-UP is responsible for performing access control interaction with a broadband remote access server control plane (BRAS-CP) of the BRAS. Then, the access control procedure is completed, the user authentication succeeds, the user obtains valid address allocation, and the wired broadband access enters the user traffic forwarding procedure.

For the transmission of the access control message between the user plane and the control plane of the BRAS (or BNG), one solution is a layer 2 transmission scheme based on intra-domain routing, such as VxLAN, which cannot achieve the transmission of the access control message and the intelligent traffic steering of the data flow of the access control message in the scenario where the user plane and the control plane are deployed separately in different network domains; another solution is the GTP-U transmission scheme, which cannot support the intelligent traffic steering of access control message data.

In view of the above, an embodiment of the present application provides a data forwarding method, and the transmission of the access control message between the user plane and the control plane of the BRAS (or BNG) based on the segment routing over IPv6 (SRv6) supports intra-domain and cross-domain message transmission and achieves the intelligent traffic steering of the access control message data, providing operators with more flexible and intelligent virtual broadband remote access server (vBRAS) (or disaggregated broadband remote access server (DBNG)) traffic flow engineering solutions.

FIG. 1 is a flowchart of a data forwarding method according to an embodiment of the present application. This embodiment is applied in a first communication node. For example, the first communication node is a network access control node user plane, for example, the network access control node user plane may be a BRAS user plane node (that is, a BRAS user plane) or a BNG control plane. As shown in FIG. 1, the data forwarding method in this embodiment includes S110 and S120.

In S110, in response to receiving a user access request, a meta array of a first communication node and an original access control message are encapsulated to obtain a first access control message. In an embodiment, the user access request refers to a request of the user for network communication. In an embodiment, the user access request is initiated by a user access gateway, the BRAS user plane is accessed via the access network device, and the BRAS user plane is responsible for performing access control interaction with the BRAS control plane. In the process of the transmission of the access control message between the BRAS user plane and the BRAS control plane, the BRAS user plane needs to encapsulate both the original access control message and the hardware meta array of the user plane to which the original access control message belongs, so as to obtain the first access control message.

In S120, the first access control message is forwarded to a second communication node according to a pre-orchestrated path.

In an embodiment, the second communication node may be a BRAS control plane node (that is, a BRAS control plane). In an embodiment, the SRv6-based BRAS or BNG transmits an access control message between the user plane and the control plane. SRv6 is a network forwarding protocol that supports both intra-domain and cross-domain message transmission. Meanwhile, when the first access control message is transmitted, the BRAS user plane may orchestrate the transmission path from the BRAS user plane to the BRAS control plane according to the requirements of traffic flow engineering, so as to directly transmit the first access control message carrying the hardware meta array to the second communication node, thereby achieving the intelligent traffic steering of the access control message while supporting intra-domain and cross-domain message transmission.

In an embodiment, the original access control message and the hardware meta array to which the original access control message belongs are encapsulated in one of the following manners: the meta array of the first communication node is extended in a destination options extension header of Internet Protocol version 6 (IPv6) according to a first preset mode; or the meta array of the first communication node is extended in a segment routing header (SRH) of SRv6 according to the first preset mode.

The meta array of the first communication node and the original access control message are encapsulated in one of the following manners: the meta array of the first communication node is extended in a destination options extension header of IPv6 according to a first preset mode; or the meta array of the first communication node is extended in an SRH of SRv6 according to the first preset mode.

In an embodiment, the first preset mode includes a type-length-value (TLV) mode. In an embodiment, the encapsulation of the hardware meta array of the BRAS user plane or the BNG user plane may be supported based on an IPv6 extension scheme and an SRv6 extension scheme. In an embodiment, the hardware meta array of the user plane is extended and encapsulated in the destination options header of IPv6, that is, the hardware meta array of the user plane is encapsulated using an IPv6 extension header in the data portion of the destination options extension header in the TLV mode. In an embodiment, the meta data of the user plane (BRAS-UP or DBNG-UP) is extended in the encapsulation header SRH of SRv6, that is, the hardware meta array of the user plane is encapsulated in the optional extension portion of the SRH in the TLV mode.

In an embodiment, the hardware meta array includes at least one of: a port number, a line card number, a board card number, a socket number, and a rack number. In an embodiment, in the process of encapsulating the hardware meta array, the order of each meta data is not limited, that is, the order of the port number, line card number, board card number, socket number, and rack number is not limited.

In an embodiment, the destination options extension header is placed before a Layer 2 message header. In an embodiment, in order to ensure that the intermediate routing node does not recognize or process the hardware meta array during the process of the transmission of the first access control message from the first communication node to the second communication node, the destination options extension header encapsulated with the hardware meta array may be placed before the Layer 2 message header, but not before the SRH.

In an embodiment, the first access control message is forwarded to the second communication node according to the pre-orchestrated path in the following manner: a transmission path to the second communication node is orchestrated according to a traffic flow demand to obtain a first preset transmission path; and the first access control message is forwarded to the second communication node according to the first preset transmission path.

In an embodiment, the transmission path to the second communication node is orchestrated according to the traffic flow demand in the following manner: a SID list of the SRH is encapsulated, and the second communication node is set as a path endpoint. In an embodiment, the SRv6-based path orchestration is performed in the BRAS user plane or the BNG user plane to achieve the on-demand steering of the data flow of the first access control message.

FIG. 2 is a flowchart of another data forwarding method according to an embodiment of the present application. The embodiment is applied in a second communication node. For example, the second communication node is a network access control node control plane, for example, the network access control node control plane may be a BRAS control plane or a BNG control plane. As shown in FIG. 2, the data forwarding method in this embodiment includes S210 and S220.

In S210, a first access control message sent by a first communication node is received.

In S220, the first access control message is parsed to obtain an original access control message and a meta array of the first communication node.

In an embodiment, after the second communication node receives the first access control message, the hardware meta array of the user plane is parsed and recognized from the destination options extension header or from SRH, the Layer 2 access control message (that is, the original access control message) is parsed, and the forwarding procedure of the access control message is ended. In an embodiment, the present application provides an SRv6-based BRAS (or BNG) user and control plane access control message transmission solution, thereby achieving the intelligent traffic steering of the access control message data while supporting intra-domain and cross-domain message transmission and providing operators with more flexible and intelligent vBRAS (or DBNG) traffic flow engineering solutions.

In an embodiment, for the transmission of the access control message between the user plane (for example, BRAS-UP or DBNG-UP) and the control plane (for example, BRAS-CP or DBNG-CP), the user plane needs to encapsulate and send both the original access control message (such as PPPoE, IPoE, L2TP, and the like) and the hardware meta data of the user plane to which the original access message belongs (for example, an interface, a port number, a line card number, a board card number, a socket number, and the like) to the control plane so that the control plane can accurately perform subsequent control message interaction with the corresponding user plane. These meta data (also referred to as meta array) do not belong to the original access control message (Layer 2 protocol message), and dedicated fields need to extended for encapsulation. The embodiments of the present application provide an SRv6-based extension scheme and an IPv6-based extension scheme to support the encapsulation of the meta data in the BRAS (or BNG) user plane.

In solution one, the data array of the user plane is extended and encapsulated in the destination options expansion header of IPv6, that is, the meta data of the user plane is encapsulated in the data portion of the destination extension header using an IPv6 expansion header in the TLV mode, and a plurality of meta data has no specific order requirement between the TLV and may include a port number, a line card number, a board number, a socket number, and a rack number.

In the access control message transmission from the user plane to the control plane, in order to ensure that each meta array type is correctly recognized, the upper two bits of IPv6 or SRv6 type field are 10, and the third upper bit CHG of the type field is 0, that is, the meta data cannot be changed at the intermediate node. The reading, parsing and application of the meta data are only related to the endpoint of the user and control plane routing, and the intermediate nodes do not need to perform any processing. Therefore, the destination options extension header must be placed before the Layer 2 message header (for example, Layer 2 access messages such as IPoE, PPPoE, L2TP, and the like), but not before SRH. Therefore, a new endpoint network function End.bng-u is defined to extract the meta data of the user plane and the access control message in the Layer 2 and end the access control forwarding procedure. The type value is uniformly allocated and coordinated by The Internet Assigned Numbers Authority (IANA) and may also be coordinated and allocated by enterprises or alliances in local application scenarios to ensure the global feature of the type value. FIG. 3 is a schematic diagram illustrating a TLV encapsulation format according to an embodiment of the present application. As shown in FIG. 3, the user plane may encapsulate the meta data according to a type-length-value order.

In the case of the intelligent data flow steering of the access control message, the SRv6-based path orchestration is performed in the user plane, so as to achieve the on-demand steering of the data flow of the access control message.

In solution two, the meta data of the user plane (BRAS-UP & DBNG-UP) is extended in the expansion header SRH of SRv6, that is, the meta data of the user plane is encapsulated in the optional extension portion of the SRH in the TLV mode, and a plurality of metadata has no specific order requirement between the TLV and may include a port number, a line card number, a board number, a socket number, and a rack number.

The routing node between the user plane and the control plane does not need to recognize and process the meta data, but the meta data is decapsulated only at the control plane (that is, the endpoint). Therefore, a new endpoint network function is defined to extract the meta data of the user plane and the access control message in the Layer 2 and end the access control forwarding procedure. The type value is uniformly allocated and coordinated by the IANA and may also be coordinated and allocated by enterprises or alliances in local application scenarios to ensure the global feature of the type value.

The SRv6-based path orchestration is performed in the user plane to achieve the on-demand steering of the data flow of the access control message.

In an embodiment, in the transmission of the access control message with BRAS (or BNG) user and control plane separation in a fixed network, in addition to the transmission from the user plane to the control plane, the transmission from the control plane to the user plane is also unicast transmission (except for 1+1 hot backup protection scenario), similarly, the access control message is transmitted through SRv6 to achieve the flexible path orchestration, and different from the transmission from the user plane to the control plane, the meta data does not need to be encapsulated in this scenario.

In an embodiment, the user plane node may be a physical node or a virtual node, and in both cases, the user plane needs to encapsulate its own meta data to inform the control plane. In the case of the virtual user plane, the meta data includes a virtual port number and a virtual socket number, and the meta data type may reuse the meta data definition corresponding to the physical user plane. In an embodiment, the SRv6-based BRAS (or BNG) user plane and control plane perform the cross-domain transmission on the access control message. In an embodiment, the meta data of the user plane is encapsulated by extending the destination options extension header. FIG. 4 is a schematic diagram illustrating the user plane and control plane cross-domain transmission of an access control message according to an embodiment of the present application.

As shown in FIG. 4, the user plane (UP) and the control plane (CP) belong to two different network domains. After a user access control message forwarded by an RG arrives in the UP, the UP orchestrates a cross-domain transmission path from the user plane to the control plane according to the traffic flow engineering demand, that is, the SID list of the SRH is encapsulated, and sets a control plane node as a path endpoint to steer the access control message flow to be transmitted according to the designated path. Meanwhile, the meta data of the UP is encapsulated in the destination options extension header using a TLV format, and the extension header is placed before a Layer 2 message header. The encapsulated SRv6 data message is forwarded across domains according to the path indicated by the SID list, and the intermediate routing node does not recognize or process the meta data of the user plane. After the control plane node receives the message, the control plane node parses and recognizes the meta data of the user plane from the destination options extension header, parses a Layer 2 access control message, and ends the forwarding procedure of the access control message.

In an embodiment, the SRv6-based BRAS (or BNG) user plane and control plane perform the cross-domain transmission on the access control message. In an embodiment, the meta data of the user plane is encapsulated by extending the SRH optional portion.

As shown in FIG. 4, the user plane (UP) and the control plane (CP) belong to two different network domains. After a user access control message forwarded by an RG arrives in the UP, the UP orchestrates a cross-domain transmission path to the control plane according to the traffic flow engineering demand, that is, the SID list of the SRH is encapsulated, and sets a control plane node as a path endpoint to steer the access control message flow to be transmitted according to the designated path. Meanwhile, the SRH optional portion is extended to encapsulate the meta data, and the meta data is encapsulated using a TLV format. The encapsulated SRv6 data message is forwarded across domains according to the path indicated by the SID list, and the intermediate nodes do not recognize or process the meta data of the user plane. After the control plane node receives the message, the control plane node parses and recognizes the meta data of the user plane from the SRH, parses a Layer 2 access control message, and ends the forwarding procedure of the access control message.

Figure 5:
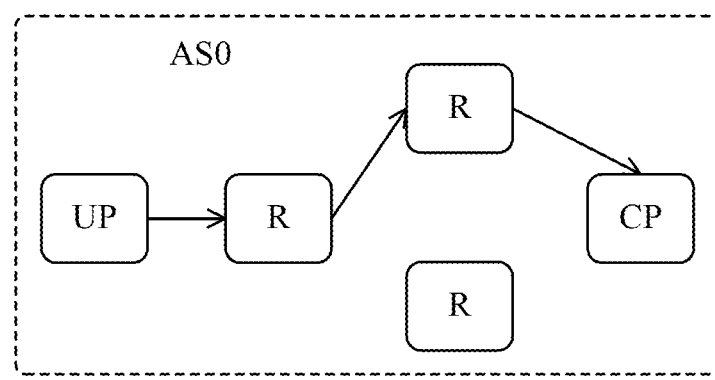
FIG. 5 is a schematic diagram illustrating the user plane and control plane intra-domain transmission of an access control message according to an embodiment of the present application.

In an embodiment, the SRv6-based BRAS (or BNG) user plane and control plane perform the intra-domain transmission on the access control message. In an embodiment, the meta data of the user plane is encapsulated by extending the destination options extension header. FIG. 5 is a schematic diagram illustrating the user plane and control plane intra-domain transmission of an access control message according to an embodiment of the present application.

As shown in FIG. 5, the user plane (UP) and the control plane (CP) belong to the same network domain. After a user access control message forwarded by an RG arrives in the UP, the UP orchestrates a transmission path to the control plane according to the traffic flow engineering demand, that is, the SID list of the SRH is encapsulated, and sets a control plane node as a path endpoint to steer the access control message flow to be transmitted according to the designated path. Meanwhile, the meta data of the UP is encapsulated in the destination options extension header, and the extension header is placed before a Layer 2 message header. The encapsulated SRv6 data message is forwarded within the domain according to the path indicated by the SID list, and the intermediate routing node does not recognize or process the meta data of the user plane. After the control plane node receives the message, the control plane node parses and recognizes the meta data of the user plane from the destination options extension header, parses a Layer 2 access control message, and ends the forwarding procedure of the access control message. In an embodiment, the SRv6-based BRAS (or BNG) user plane and control plane perform the intra-domain transmission on the access control message. In an embodiment, the meta data of the user plane is encapsulated by extending the SRH optional portion.

As shown in FIG. 5, the user plane (UP) and the control plane (CP) belong to the same network domain. After a user access control message forwarded by an RG arrives at the UP, the UP orchestrates a transmission path to the control plane according to the traffic flow engineering demand, that is, the SID list of the SRH is encapsulated, and sets a control plane node as a path endpoint to steer the access control message flow to be transmitted according to the designated path. Meanwhile, the SRH optional portion is extended to encapsulate the meta data, and the meta data is encapsulated using a TLV format. The encapsulated SRv6 data message is forwarded within the domain according to the path indicated by the SID list, and the intermediate nodes do not recognize or process the meta data of the user plane. After the control plane node receives the message, the control plane node parses and recognizes the meta data of the user plane from the SRH header, parses a Layer 2 access control message, and ends the forwarding procedure of the access control message.

Figure 6:
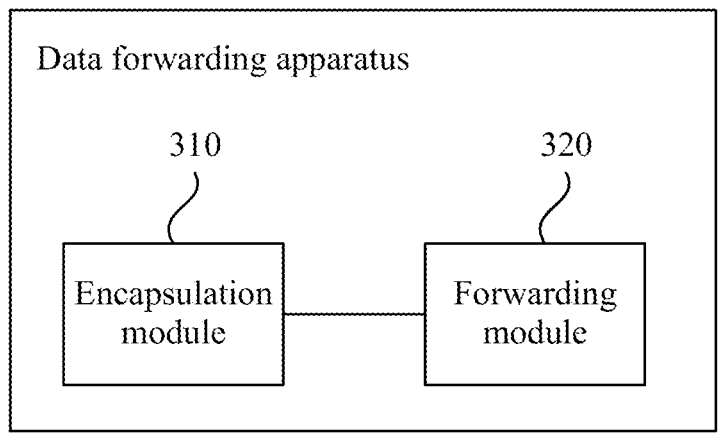
FIG. 6 is a block diagram of a data forwarding apparatus according to an embodiment of the present application.

In an embodiment, FIG. 6 is a block diagram of a data forwarding apparatus according to an embodiment of the present application. This embodiment is applied in a first communication node.

As shown in FIG. 6, the data forwarding apparatus in this embodiment includes an encapsulation module 310 and a forwarding module 320.

The encapsulation module 310 is configured to, in response to receiving a user access request, encapsulate a meta array of the first communication node and an original access control message to obtain a first access control message.

The forwarding module 320 is configured to forward the first access control message to a second communication node according to a pre-orchestrated path.

The data forwarding apparatus provided in this embodiment is configured to implement the data forwarding method applied by the first communication node in the embodiment shown in FIG. 1. The implementation principle and effects of the data forwarding apparatus provided in this embodiment are similar to those of the data forwarding method, and details will not be repeated here.

In an embodiment, the original access control message and the hardware meta array to which the original access control message belongs are encapsulated in one of the following manners.

The meta array of the first communication node is extended in a destination options extension header of IPv6 according to a first preset mode.

The meta array of the first communication node is extended in an SRH of SRv6 according to the first preset mode.

In an embodiment, the destination options extension header is placed before a Layer 2 message header.

In an embodiment, the first preset mode includes a TLV mode.

In an embodiment, the meta array includes at least one of: a port number, a line card number, a board card number, a socket number, and a rack number.

In an embodiment, the first access control message is forwarded to the second communication node according to the pre-orchestrated path in the following manner.

A transmission path to the second communication node is orchestrated according to a traffic flow demand to obtain a first preset transmission path.

The first access control message is forwarded to the second communication node according to the first preset transmission path.

In an embodiment, the transmission path to the second communication node is orchestrated according to the traffic flow demand in the following manner: a SID list of the SRH is encapsulated, and the second communication node is set as a path termination point.

In an embodiment, the first communication node is a BRAS user plane node and the second communication node is a BRAS control plane node.

Figure 7:
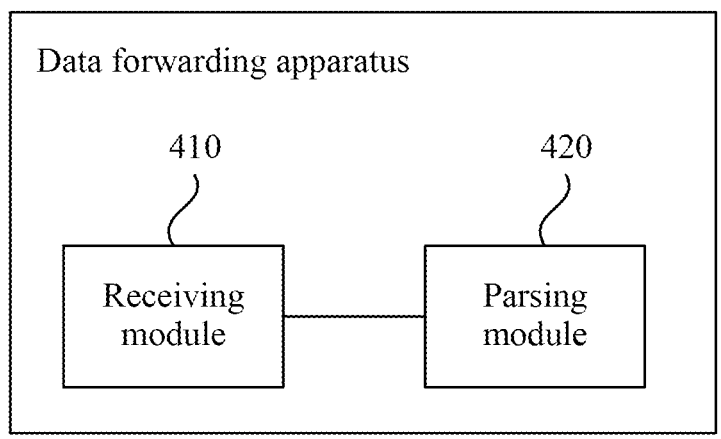
FIG. 7 is a block diagram of another data forwarding apparatus according to an embodiment of the present application.

In an embodiment, FIG. 7 is a block diagram of another data forwarding apparatus according to an embodiment of the present application. The embodiment is applied to a second communication node. As shown in FIG. 7, the data forwarding apparatus in the embodiment includes a receiving module 410 and a parsing module 420.

The receiving module 410 is configured to receive a first access control message sent by a first communication node.

The parsing module 420 is configured to parse the first access control message to obtain an original access control message and a meta array of the first communication node.

The data forwarding apparatus provided in this embodiment is configured to implement the data forwarding method applied by the second communication node in the embodiment shown in FIG. 2. The implementation principle and effects of the data forwarding apparatus provided in this embodiment are similar to those of the data forwarding method, and details will not be repeated here.

Figure 8:
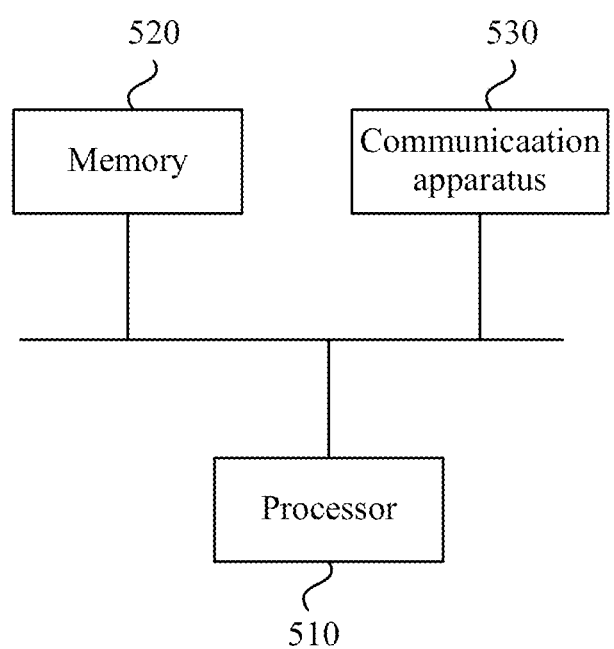
FIG. 8 is a structural diagram of a device according to an embodiment of the present application.

FIG. 8 is a structural diagram of a device according to an embodiment of the present application. As shown in FIG. 8, the device provided in the present application includes a processor 510, a memory 520 and a communication module 530. The number of processors 510 in the device may be one or more, and one processor 510 is illustrated as an example in FIG. 8. The number of memories 520 in the device may be one or more, and one memory 520 is illustrated as an example in FIG. 8. The processor 510, the memory 520 and the communication module 930 in the device may be connected via a bus or in other manners, and the connection via the bus is illustrated as an example in FIG. 8. In this embodiment, the device is a first communication node.

As a computer-readable storage medium, the memory 520 may be configured to store software programs and computer-executable programs and modules such as program instructions/modules (for example, the encapsulation module and the forwarding module in the data forwarding apparatus) corresponding to the device in any embodiment of the present application. The memory 520 may include a program storage region and a data storage region. The program storage region may store an operating system and an application program required by at least one function, and the data storage region may store data created depending on the use of the device. In addition, the memory 520 may include a high-speed random-access memory and may also include a non-volatile memory such as at least one disk memory, flash memory or another non-volatile solid-state memory. In some examples, the memory 520 may include memories which are remotely disposed with respect to the processor 510, and these remote memories may be connected to the device via a network. Examples of the preceding network include the Internet, an intranet, a local area network, a mobile communication network, and a combination thereof.

The communication module 530 is configured to establish a communication connection between the first communication node and the second communication node for data communication and signal communication.

The preceding device may be configured to perform the data forwarding method applied by the first communication node in any preceding embodiment and has corresponding functions and effects.

In a case where the device is the second network element, the preceding device may be configured to perform the data forwarding method applied by the second network element in any preceding embodiment and has corresponding functions and effects.

An embodiment of the present application further provides a storage medium including computer-executable instructions. The computer-executable instructions, when executed by a computer processor, are used for performing a data forwarding method applied by a first communication node. The method includes: in response to receiving a user access request, a meta array of the first communication node and an original access control message are encapsulated to obtain a first access control message, and the first access control message is forwarded to a second communication node according to a pre-orchestrated path.

An embodiment of the present application further provides a storage medium including computer-executable instructions. The computer-executable instructions, when executed by a computer processor, are used for performing a data forwarding method applied by a second communication node. The method includes: a first access control message sent by a first communication node is received, and the first access control message is parsed to obtain an original access control message and a meta array of the first communication node.

The user device encompasses any suitable type of wireless user device, such as a mobile phone, a portable data processing apparatus, a portable web browser or a vehicle-mounted mobile station. Various embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable to the local technical environment and may be implemented by using any suitable data storage technology. For example, the memory may be a read-only memory (ROM), a random-access memory (RAM), an optical memory apparatus and system (digital video disc (DVD) or compact disk (CD)) or the like. Computer-readable media may include non-transitory storage media. The data processor may be of any type suitable for the local technical environment, such as a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A data forwarding method, applied by a first communication node and comprising:
   in response to receiving a user access request, encapsulating a meta array of a first communication node and an original access control message to obtain a first access control message; and
   forwarding the first access control message to a second communication node according to a pre-orchestrated path;
   wherein the encapsulating the meta array of the first communication node and the original access control message comprises:
   extending the meta array of the first communication node in a segment routing header (SRH) of segment routing over IPv6 (SRv6) according to a first preset mode;
   wherein the first communication node is a broadband remote access server (BRAS) user plane node and the second communication node is a BRAS control plane node.

2. The method of claim 1, wherein the first preset mode comprises a type-length-value (TLV) mode.

3. The method of claim 1, wherein the meta array comprises at least one of: a port number, a line card number, a board card number, a socket number, and a rack number.

4. The method of claim 1, wherein the forwarding the first access control message to the second communication node according to the pre-orchestrated path comprises:
   orchestrating a transmission path from the first communication node to the second communication node according to a traffic flow demand to obtain a first preset transmission path; and
   forwarding the first access control message to the second communication node according to the first preset transmission path.

5. The method of claim 4, wherein orchestrating the transmission path to the second communication node according to the traffic flow demand comprises: encapsulating a segment identifier (SID) list of the SRH and setting the second communication node as a path endpoint.

6. A storage medium storing a computer program, wherein the computer program, when executed by a processor, implements the data forwarding method according to claim 1.

7. A data forwarding method, applied by a second communication node and comprising:
   receiving a first access control message sent by a first communication node; and
   parsing the first access control message to obtain an original access control message and a meta array of the first communication node;
   wherein the meta array is encapsulated by the first communication node in following manner:
   extending the meta array of the first communication node in a segment routing header (SRH) of segment routing over IPv6 (SRv6) according to a first preset mode;
   wherein the first communication node is a broadband remote access server (BRAS) user plane node and the second communication node is a BRAS control plane node.

8. A device, comprising a memory and one or more processors;
   wherein the memory is configured to store one or more programs; and
   the one or more programs are executed by the one or more processors to enable the one or more processors to implement a data forwarding method, wherein the data forwarding method comprises:
   in response to receiving a user access request, encapsulating a meta array of a first communication node and an original access control message to obtain a first access control message; and
   forwarding the first access control message to a second communication node according to a pre-orchestrated path;
   wherein the encapsulating the meta array of the first communication node and the original access control message comprises:
   extending the meta array of the first communication node in a segment routing header (SRH) of segment routing over IPv6 (SRv6) according to a first preset mode;

wherein the first communication node is a broadband remote access server (BRAS) user plane node and the second communication node is a BRAS control plane node.

9. The device of claim 8, wherein the first preset mode comprises a type-length-value (TLV) mode.

10. The device of claim 8, wherein the meta array comprises at least one of: a port number, a line card number, a board card number, a socket number, and a rack number.

11. The device of claim 8, wherein the forwarding the first access control message to the second communication node according to the pre-orchestrated path comprises:
   orchestrating a transmission path from the first communication node to the second communication node according to a traffic flow demand to obtain a first preset transmission path; and
   forwarding the first access control message to the second communication node according to the first preset transmission path.

12. The device of claim 11, wherein orchestrating the transmission path to the second communication node according to the traffic flow demand comprises: encapsulating a segment identifier (SID) list of the SRH and setting the second communication node as a path endpoint.

* * * * *